(12) United States Patent
Bopp et al.

(10) Patent No.: US 6,715,842 B1
(45) Date of Patent: Apr. 6, 2004

(54) VEHICLE WHEEL WITH A RIM CARRYING SOUND-ABSORBING FIBER MATERIAL

(75) Inventors: Michael Bopp, Witten (DE); Gabriele Brade-Scholz, Kempen (DE); Olaf Doehring, Dortmund (DE); Martin Herf, Witten (DE); Ivo Lorenz, Bautzen (DE)

(73) Assignee: HP-Chemie Pelzer Research and Development Ltd., Waterford (IE)

( * ) Notice: Subject to any disclaimer, the term of this patent is extended or adjusted under 35 U.S.C. 154(b) by 0 days.

(21) Appl. No.: 09/936,260

(22) PCT Filed: Mar. 9, 2000

(86) PCT No.: PCT/EP00/02032

§ 371 (c)(1),
(2), (4) Date: Jan. 11, 2002

(87) PCT Pub. No.: WO00/53438

PCT Pub. Date: Sep. 14, 2000

(30) Foreign Application Priority Data

Mar. 10, 1999 (DE) .......................... 199 10 702

(51) Int. Cl.$^7$ .................. B60B 19/00; B60B 37/00; B60C 23/18
(52) U.S. Cl. .................. 301/6.91; 152/153
(58) Field of Search .................. 301/6.91 I, 5.21, 301/5.22; 295/7; 74/443; 152/153, 209.4, 209.6, 209.7, 311, 339.1, 450; 139/391; 428/85, 90, 91, 97

(56) References Cited

U.S. PATENT DOCUMENTS

| | | | | | |
|---|---|---|---|---|---|
| 3,047,285 | A | * | 7/1962 | Gross | 267/64.27 |
| 3,716,078 | A | * | 2/1973 | Clark | 139/399 |
| 4,381,026 | A | * | 4/1983 | Skidmore | 152/153 |
| 4,755,006 | A | * | 7/1988 | Clay et al. | 301/5.22 |
| 5,186,025 | A | * | 2/1993 | Neher | 66/9 R |
| 6,343,843 | B1 | * | 2/2002 | Nishikawa | 301/6.91 |
| 6,422,655 | B1 | * | 7/2002 | Britton et al. | 301/6.91 |

FOREIGN PATENT DOCUMENTS

| | | |
|---|---|---|
| DE | 198 19 128 A1 | 4/1998 |
| EP | 0 029 120 A1 | 10/1980 |
| WO | WO 99/55542 | 4/1999 |

* cited by examiner

Primary Examiner—S. Joseph Morano
Assistant Examiner—Jason R. Bellinger
(74) Attorney, Agent, or Firm—Diller, Ramik & Wight

(57) ABSTRACT

A vehicle wheel includes a wheel rim having an outside carrying airborne noise-absorbing fiber material in the form of a carrier layer having fibers projecting radially outwardly of an outside of the rim. The rim has an interior tire bead contact area which is spaced from an edge of the fiber material a distance at least equal to the length of the fibers to prevent the latter from entering the tire bead contact area. The fiber material is also preferably located at a depressed area between rim beads and the length of the fibers is preferably between 5 mm and 40 mm.

18 Claims, 2 Drawing Sheets

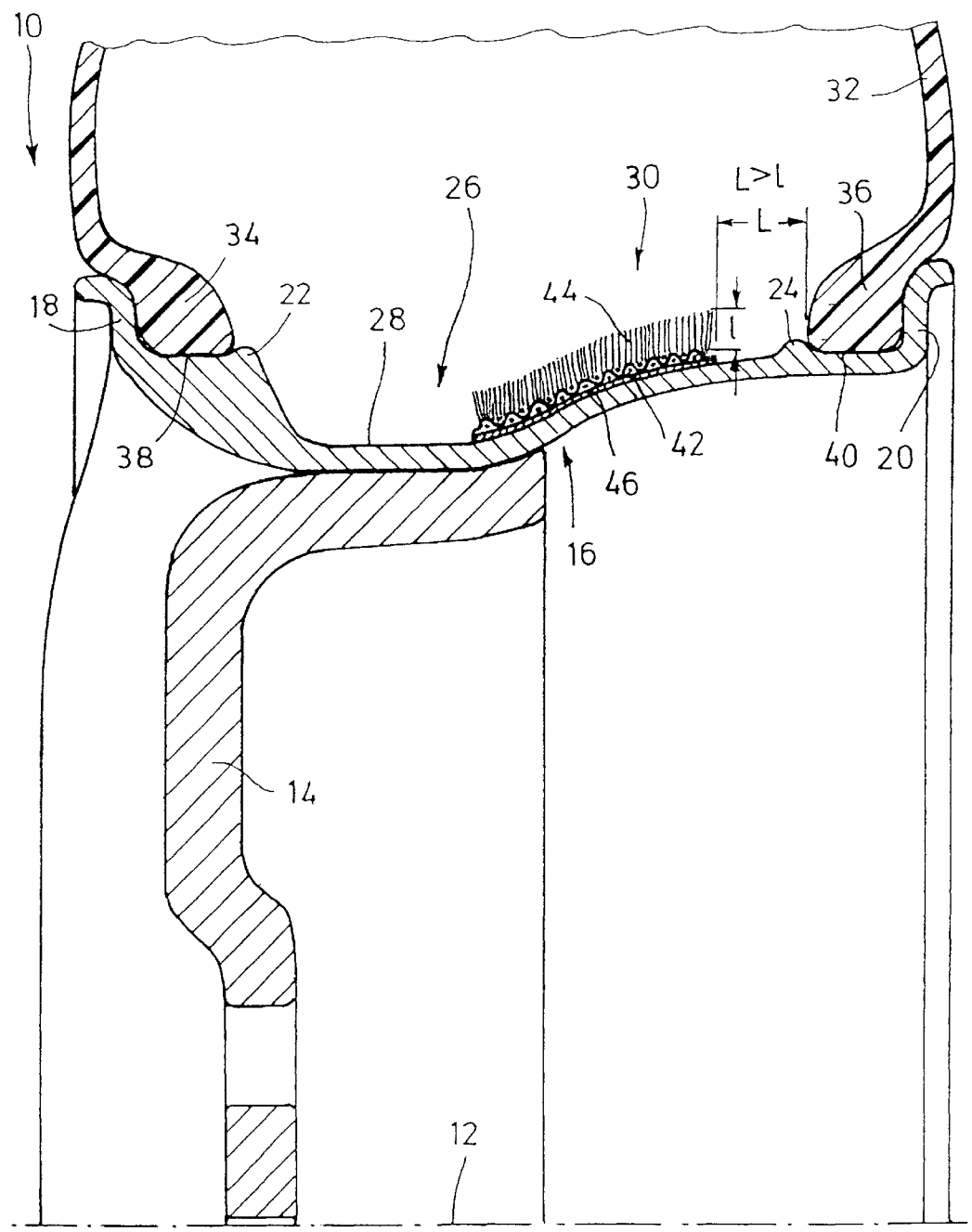

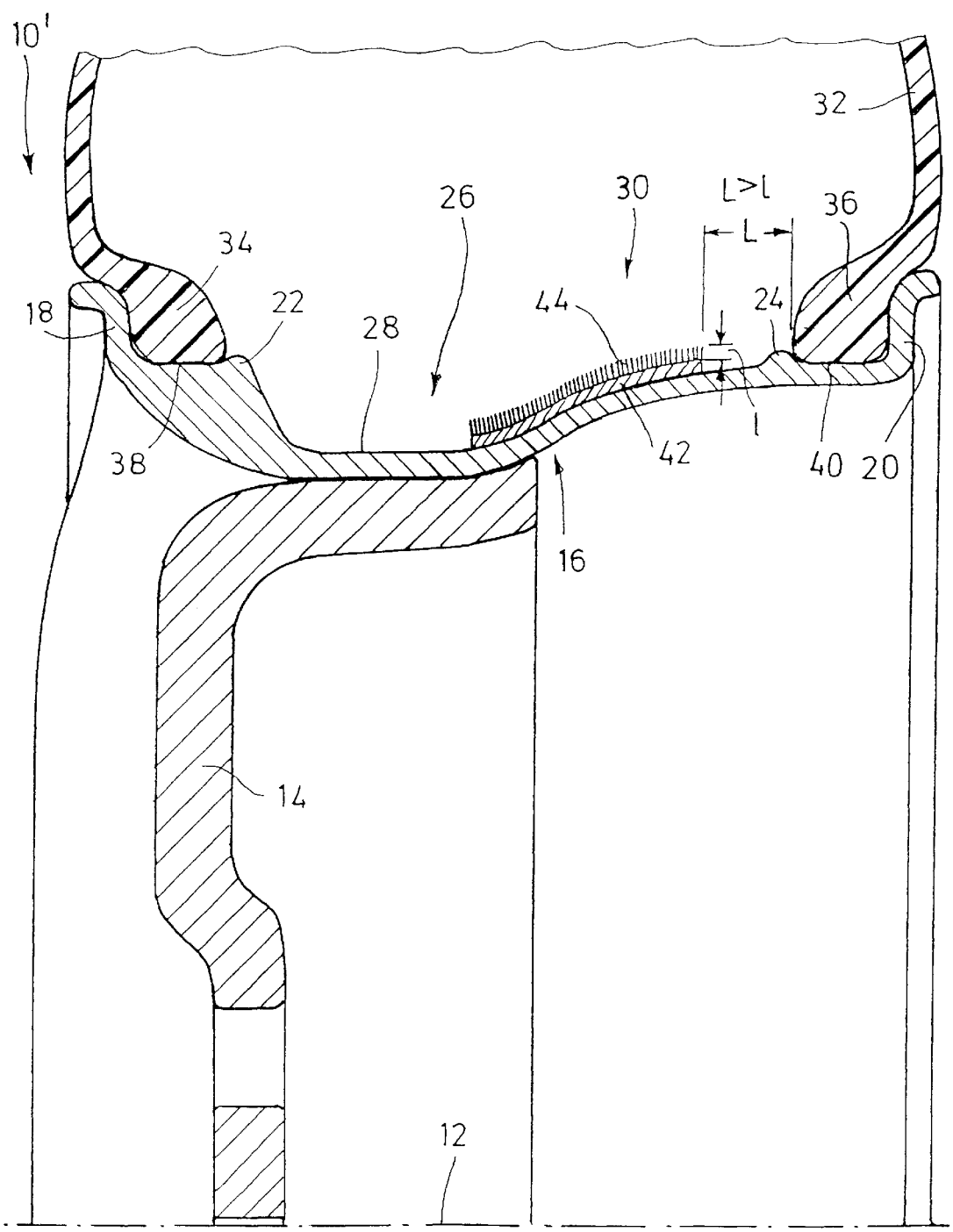

VEHICLE WHEEL WITH A RIM CARRYING SOUND-ABSORBING FIBER MATERIAL

BACKGROUND OF THE INVENTION

The invention is a vehicle wheel, particularly adapted for use for a passenger car though the vehicle wheel can be utilized in conjunction with most any vehicle, such as truck or automobile wheels, motorcycle wheels, bicycle wheels or similar two-wheel vehicles.

In order to increase the driving comfort of vehicles, the motor vehicle industry is increasingly confronted with deadening structure-borne noise arising from the rolling of tires that adversely affects the passenger compartment through wheels, axles, axle suspension and chassis.

It is known from WO-A-99/55542, DE-A-198 19 128, DE-A-44 00 912 and EP-A-0029 120 to place sound absorbing material on the exterior wheel rim and/or the inner tire. In the case of sound absorbing fibers, they are arranged in a ball, intertwined and placed in a perforated wrapping ringed around the wheel rim and jutting out into the interior wheel (see e.g. FIGS. 5 and 6 from EP-A-0 029 120). From DE-A-38 23 157 a surface formation coated with flock fibers is known that can be used for noise deadening purposes.

Even though conventional vehicle wheels posses good noise deadening properties due to the use of noise deadening materials, these systems have the disadvantage that the mounting of noise absorption material and tire to the wheel rim requires considerable work.

The invention is a vehicle wheel with a sound absorbing material that is easy to fit and to remove without damaging the sound absorbing material, and thus noise absorbing properties during wheel operation are reduced.

SUMMARY OF THE INVENTION

In order to reduce vehicle wheel sounds the invention proposes a vehicle wheel, especially for motor vehicles such as passenger cars, equipped with a wheel disk adapted to be mounted for rotation about a rotation axis, a wheel rim linked to the wheel disk and having an exterior side curved or turned away from the disk, an airborne sound absorbing fiber material arranged on the outside surface of the wheel rim, the fiber material has a carrier layer resting on the outside surface of the rim with an underside of the carrier layer contacting the outside surface of the rim and its outer surface having fibers jutting out away from the outside rim, and the carrier layer is held to the outside surface of the rim.

Every vehicle wheel has a wheel rim serving as a receptacle and holding device for the wheel. The wheel rim itself is linked to the rotation axis through the so-called wheel disk. The wheel disk and rim generally consist of metal (steel or light metal). According to the invention, an airborne sound absorbing fiber material is attached to the outside surface of the rim which, with the wheel mounted thereon, is interiorly of the wheel. This material is mechanically stable, temperature resistant, and is reliably fixed to the rim to resist mechanical strains (centrifugal forces during wheel operation and transverse loads during mounting and dismounting tires) and temperature impacts (in the interior tire and at the rim, temperatures of up to 120° C. can arise).

The fiber material has a carrier layer, preferably arranged around the rim in the form of a strip and attached to the rim. Fibers jut out from the carrier layer, are loop-shaped, or the fiber ends project away from the carrier layer. Fiber material, such as loops, plush, single fibers, yarns (crossing fibers) or felt whose fibers are embedded in the carrier layer are suitable as sound absorbing fiber material.

In order to keep the "rotating mass" produced by the vehicle wheel in spite of the airborne sound absorbing material as low as possible, it is advantageous for the sound absorbing material to be light weight, such as synthetic fiber material (polyamide, polyacryle, polyester, PP, viscose) having fibers anchored to the light-weight carrier layer. The carrier layer should be mechanically stable and resistive to high tensile stress at times caused by extreme centrifugal forces occurring from the rotation of the vehicle wheel and transverse loads experienced during mounting and dismounting of tires.

Plush materials made from synthetic fibers, natural fibers or a blend of both are conventionally available as sound absorbing material. These plush materials are used for various purposes. Plush material can, for instance, be found on the backside of seat covers made from lamb's wool and as fill for rag animals. Tests have shown that excellent sound absorbing properties can be obtained with plush material having a fiber length between 10 mm and 25 mm (fiber length is equal to the distance between free end of fiber and the carrier layer). The weight per unit area of the plush material is between approximately 300 and 1800 g/m². Fiber materials with a weight per unit area (fibers and carrier layer) of up to 3 kg /m², preferably 2 kg/m² and especially up to 1.5 kg/m², can be used as sound absorbing material.

The greater the density and length of the fibers of the fiber material used as airborne sound absorbing material the better will be the sound absorbing effect of the fiber material. The length of fibers can, however, be limited. The mounting of the tire cannot be constrained in spite of the sound absorbing material attached to the rim.

Tests have shown that fiber length of 5 mm to 40 mm, especially 10 to 25 mm and preferably 12 to 20 mm, allow a good compromise between easy mounting of the tire and sound absorbing properties of the fiber material. The sound absorbing material can, under consideration of the above mentioned conditions, only be attached to the area of the rim in which the outside surface is below the level of (has a lesser circumference than) the bearing areas of the tire beads. Most of the time, this is possible in the central axial area of the rim between the rim beads. However, the sound absorbing material should not be placed into the so-called drop base rim or well base rim (depression of rim in an outside surface).

The distance between absorbing fiber material and inner bearing areas of the rim, i.e. areas farther from the wheel disk, should be at least equal to the maximum height of the sound absorbing material layer. In the case of a fiber material with fibers jutting out from a carrier layer and having a certain length, the distance described above should be at least equal to the fiber length. This is due to the fact that in such a case fibers which lay down because of the push of the inner tire bead over the fiber material during tire mounting do not enter the bearing area. The bearing area should be free of impurities that can also consist of fibers, since tight bead-to-bead contact of the tire to the rim is a prerequisite in this area.

The carrier layer is either a woven textile to which the fibers are anchored or a layer of, e.g. adhesive, in which the fibers are partly embedded. In case of a woven carrier layer, the fibers are woven into the carrier layer and are thereby anchored to the carrier layer at their middles. In the case of a monolithic carrier layer, the fibers are embedded into the carrier layer through a special technology, i.e. a flocking process. The embedded ends of the fibers can be enlarged so as to be anchored more reliably into the carrier layer.

The invention counteracts vibrations that, caused by excitation of surfaces, generally create vehicle wheel contortion. Vibrations arising when vehicle wheels cross very rough surfaces or cross joints/edges/cross grooves are also avoided or reduced. The deformations of the tire in the area of the running surface lying on the ground lead to a transient vibration of the gas volume enclosed in the tire. The basic natural oscillation results from the length of the unrolled channel formed by rim and tire. The basic natural oscillation is usually between 200 Hz and 350 Hz and is mainly determined by the length of the channel (medium circumference of tire). Since the tire is relatively soft and all peripheries within the volume have even surfaces, with some determined frequencies a hum develops similar to echoes in rooms. As a consequence of the hum, tire and rim as components bordering the channel are themselves excited to vibrations (structure-borne noise) of the same or similar frequencies, which are then, as structure-borne noise, imparted to the vehicle's bodywork through wheel hub, steering knuckles, and axle shaft. A part of the noise, however, penetrates the passenger compartment as direct airborne noise and is additionally perceptible to passers-by as disturbing traffic noise.

Through the addition of airborne sound absorbing fiber material to vehicle wheels, several advantages effects are produced. The distinct natural oscillations are shifted towards lower frequencies by some Hertz (usually 5 Hz to 30 Hz). The sound intensity level of the individual natural oscillation spikes is reduced. The shift towards lower frequencies and reduction of sound level increase with increasing frequency. As a result of this modification, the basic natural oscillations to be expected from the geometry of the volume and the hum can no longer arise at certain frequencies. The reverberation of the natural oscillations fades away much faster. As a consequence, tire and rim are no longer excited to natural oscillations with these disturbing frequencies, and thus, there is no transfer of sound to the neighboring structures (tire and rim). A disturbing component in the interior noise—excited by such a resonance of the tire—is no longer perceptible. The exterior noise perceptible to passers-by, when a vehicle utilizing the invention is driven over uneven ground, is also considerably reduced.

The sound absorption effected according to the invention, i.e. adding airborne noise absorbing fiber material to the rim, consists of deadening and/or avoiding the markedness of stationary waves in the interior tire, so that only a reduced transfer of noise to the neighboring structures of the vehicle wheel is possible. The reduction of the structure-borne noise affecting the vehicle body and reduced through the deformation of the vehicle tire is obtained by deadening/avoiding the "intermediate stage" of the markedness of stationary waves in the interior tire through the airborne noise absorbing material. Mechanisms, especially glancing absorption, do play a decisive role in this context. Glancing absorption can be obtained in an effective way with the help of sound absorbing fiber material with long fibers and high density fibers. The individual fibers of the sound absorbing fiber material are aligned radially in an orderly direction by rotation of the vehicle wheel.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a fragmentary axial cross-sectional view through a vehicle wheel and tubeless tire according to a first embodiment of the invention.

FIG. 2 is a fragmentary axial cross-sectional view through a vehicle wheel tubeless tire according to a second embodiment of the invention.

DESCRIPTION OF THE PREFERRED EMBODIMENTS

A vehicle wheel 10 of FIG. 1 includes a wheel disk 14 fixed to a rim 16 which is rotational about an axis 12. The rim 16 has an exterior and an interior rim bead 18, 20, respectively, which is J-shape in axial cross-section. Adjacent to the beads 18, 20 of rim 16 are respective humps 22, 24 which is on an outside or outside surface 26 of rim 16 in the form of a swelling. Adjacent to the outside hump 22 is a well base rim 28. The well base rim 28 is a depression of the outside 26 of the rim 16 ascending from a deeper floor area (unnumbered) to a higher level of the interior hump 24. Airborne sound absorbing material—in this case in form of fiber material 30—is arranged in the area between well base rim 28 and interior hump 24. This area is with regard to fitting a tire 22 upon the rim 16, the most suitable area of the rim 16 to cover with the sound absorption material. The tubeless tire 32 has exterior and interior tire rim beads 34, 36 tightly fit to, within and against contact areas 38, 40 sealing the area between rim beads 18, 20 and humps 22, 24, respectively. The humps 22, 24 prevent the tire 32 from sliding to the interior, while the beads 18, 20 of rim 16 support the outside of the tire 32.

As can be seen from FIG. 1, the sound absorbing fiber material 30 includes a carrier layer 42 outwardly of which jut single fibers 44 (synthetic or natural). The sound absorbing fiber material 30 is a long-fiber plush available in the trade and used, e.g. as fill for plush animals. The carrier layer 42 consists of intertwined fibers (e.g. warp and wert threads) with the fibers 44 woven therein. The carrier layer 42 is attached to rim 16 by an adhesive 46. Alternative ways of attaching include mechanical fitting elements which run around rim 16 or are mechanically linked to rim 16 (e.g. screwing). Adhesive junctions between sound absorbing fiber material 30 and rim 16 are preferred because of the lighter weight.

To avoid the fibers 44 in the peripheral area from turning toward the interior hump 24 and/or the interior beads 18, 20 of rim 20 jutting out into the contact areas 38, 40 when mounting the tire 32 to rim 16, which could lead to leakages, it is preferable to arrange the fiber material 30 at a distance L of at least the length I of the fiber 44 from the interior hump 24. If fiber material 30 is used whose fibers are shortened in the peripheral area adjacent the inner hump 24 and/or the inner bead 20 of rim 16, the fiber material 30 can be arranged a correspondingly shorter distance from the interior hump 24.

The requirements of a sound absorbing fiber material 30 are temperature resistance and mechanical stability. Tests have shown that the rim 16 can tolerate temperatures of up to 120° C. The fibers 44 should have a corresponding temperature resistance. Therefore, polypropylene, polyethylene, polyamide or polyacryle can be used as material for the fibers, if synthetic fibers are included. The adhesive 46 also has to be selected according to these temperatures. Corresponding adhesives are available on the market. The fibers 44 must be anchored to the carrier layer 42 with adequate tensile strength. The borders of the fiber material strip 30 should be treated in a way (e.g. welded) that prevents the fibers 44 from coming off the carrier layer 42. As far as tensile strength and anchoring of the fibers 44 are concerned, tests have shown that plushes used as fill for rag animals can be used. Such materials have to be reliably anchored to the carrier layer since released fibers can be detrimental to human health.

A vehicle wheel 10' differs from wheel 10 by the shape of the sound absorbing fiber material 30. With wheel 10' a flock fiber material is used, whose carrier layer 42 is monolith and consists of a hardened substance (e.g. adhesive) in which the ends of the fibers 44 are incorporated. The rim of vehicle wheel 10', consisting of metal, especially aluminum or steel, is covered with short fibers 44 through a flocking process. The short fibers serve as absorbers of airborne noise. Therefore, rim 16 is with the help of a mask matching technique continuously partially coated with a temperature-resistant adhesive (carrier layer 42) in a corresponding flocking machine. In a second step, rim 16 is flock coated with short fibers 44. Superfluous fibers are then extracted. The fibers 44 are, as a consequence of their orientation in an electric field, vertically oriented with respect to the rim surface. The fibers 44 are fixed to the adhesive layer (carrier layer 42) through thermal or radiometric treatment.

Although a preferred embodiment of the invention has been specifically illustrated and described herein, it is to be understood that minor variations may be made in the apparatus without departing from the spirit and scope of the invention, as defined by the appended claims.

What is claimed is:

1. A Vehicle wheel comprising a wheel disk (14) having a rotation axis (12), a wheel rim (16) connected to the wheel disk (14), said wheel rim (16) having an outer circumferential surface (26) and axially opposite outwardly projecting bead seats (18, 20), noise-absorbing fiber material (30) located on the outer circumferential surface (26) of the rim (16), the noise-absorbing fiber material (30) having a carrier layer (42) including fibers (44) projecting outwardly of the outer circumferential surface (26) of the rim (16) and a bottom contiguous the rim (16), the carrier layer (42) being located on the outer circumferential surface (26) of the rim (16), and the length of the fibers (44) between the carrier layer (42) and their free ends being more than 5 mm and less than 40 mm.

2. A Vehicle wheel comprising a wheel disk (14) having a rotation axis (12), a wheel rim (16) connected to the wheel disk (14), said wheel rim (16) having an outer circumferential surface (26) and axially opposite outwardly projecting bead seats (18, 20), noise-absorbing fiber material (30) located on the outer circumferential surface (26) of the rim (16), the noise-absorbing fiber material (30) having a carrier layer (42) including fibers (44) projecting outwardly of the outer circumferential surface (26) of the rim (16) and a bottom contiguous the rim (16), the carrier layer (42) being located on the outer circumferential surface (26) of the rim (16), and the rim (16) having an interior tire bead contact area (40) on said outside (26) which is spaced from an edge of the fiber material (30) a distance (L) at least equal to the length (l) of the fibers (44).

3. A Vehicle wheel comprising a wheel disk (14) having a rotation axis (12), a wheel rim (16) connected to the wheel disk (14), said wheel rim (16) having an outer circumferential surface (26) and axially opposite outwardly projecting bead seats (18, 20), noise-absorbing fiber material (30) located on the outer circumferential surface (26) of the rim (16), the noise-absorbing fiber material (30) having a carrier layer (42) including fibers (44) projecting outwardly of the outer circumferential surface (26) of the rim (16) and a bottom contiguous the rim (16), the carrier layer (42) being located on the outer circumferential surface (26) of the rim (16), the rim (16) includes a depressed area (28) on the outer circumferential surface (26) located between the wheel disk (14) and an inner tire bead contact area (40), and the fiber material (30) being located between the depressed area (28) and the inner tire bead contact area (40).

4. The vehicle wheel as defined in claim 1 wherein the length of the fibers (44) are more than 10 mm and less than 25 mm.

5. The vehicle wheel as defined in claim 1 wherein the length of the fibers (44) are more than 12 mm and less than 20 mm.

6. The vehicle wheel as defined in claim 1 wherein the weight per unit area of the fiber material (30) is up to 3 $kg/m^2$.

7. The vehicle wheel as defined in claim 1 wherein the weight per unit area of the fiber material (30) is up to 2 $kg/m^2$.

8. The vehicle wheel as defined in claim 1 wherein the weight per unit area of the fiber material (30) is between 0.3 $kg/m^2$ and 1.5 $kg/m^2$.

9. The vehicle wheel as defined in claim 2 wherein the length of the fibers (44) are more than 10 mm and less than 25 mm.

10. The vehicle wheel as defined in claim 2 wherein the length of the fibers (44) are more than 12 mm and less than 20 mm.

11. The vehicle wheel as defined in claim 2 wherein the weight per unit area of the fiber material (30) is up to 3 $kg/m^2$.

12. The vehicle wheel as defined in claim 2 wherein the weight per unit area of the fiber material (30) is up to 2 $kg/m^2$.

13. The vehicle wheel as defined in claim 2 wherein the weight per unit area of the fiber material (30) is between 0.3 $kg/m^2$ and 1.5 $kg/m^2$.

14. The vehicle wheel as defined in claim 3 wherein the length of the fibers (44) are more than 10 mm and less than 25 mm.

15. The vehicle wheel as defined in claim 3 wherein the length of the fibers (44) are more than 12 mm and less than 20 mm.

16. The vehicle wheel as defined in claim 3 wherein the weight per unit area of the fiber material (30) is up to 3 $kg/m^2$.

17. The vehicle wheel as defined in claim 3 wherein the weight per unit area of the fiber material (30) is up to 2 $kg/m^2$.

18. The vehicle wheel as defined in claim 3 wherein the weight per unit area of the fiber material (30) is between 0.3 $kg/m^2$ and 1.5 $kg/m^2$.

* * * * *